Figure 1:
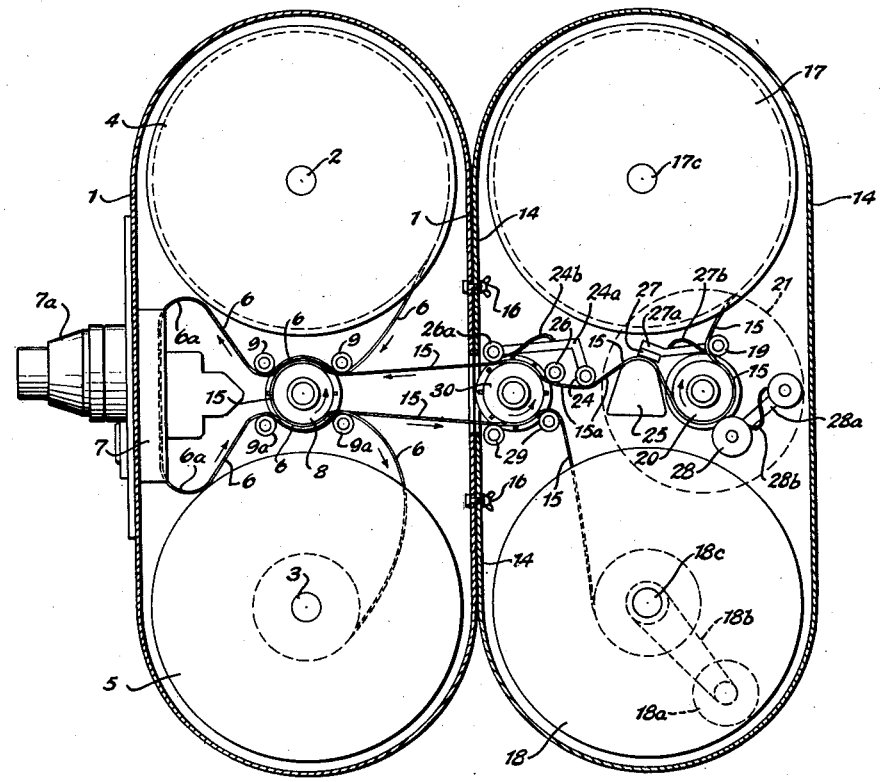

June 22, 1954  S. H. NYMAN  2,681,591
CAMERA SOUND ADAPTER DEVICE
Filed Nov. 17, 1949

INVENTOR.
STEPHEN H. NYMAN.
BY
Thomas F. Healy
ATTORNEY

Patented June 22, 1954

2,681,591

UNITED STATES PATENT OFFICE 2,681,591

CAMERA SOUND ADAPTER DEVICE

Stephen H. Nyman, Washington, D. C., assignor to Samuel Scrivener, Jr., Washington, D. C.

Application November 17, 1949, Serial No. 127,806

5 Claims. (Cl. 88—16.2)

1

This invention relates generally to the art of recording sounds and pictures as in talking motion pictures, and more particularly to an improved method of recording sound magnetically in synchronization with the picture and reproducing sound and picture together simultaneously.

Heretofore, in photo-electric sound recording, it has been found impracticable to record sound on the same film because of the graininess of the picture film and because of the editing difficulties caused by the sound being located in a different lengthwise position on the film from the related picture. Better results have been obtained by recording the sound on another film to be given separate development.

In magnetic recording on film, it has been proposed that magnetizable particles of iron filings, red iron oxide, black iron oxide or other magnetizable material be added to the same film for recording thereupon the sound record, and many means of accomplishing this have been proposed, including the placement of the magnetizable material upon the edge of the film, upon an additional width of film to be added to the normal film, upon the normal sound track area of 35 mm. and 16 mm. film, on the back of the picture film in a strip to be peeled off and removed later after re-recording on the film by photo-electric means. All of these methods require special treatment of the picture film with the risk of damage to the picture or sound area, the difficulties in some cases caused by a film of varying thickness in its width, and most of these methods require construction of a special camera. In addition there is the important disadvantage that the mechanism of the cinema camera, particularly in the 16 mm. amateur field, will not carry a film at a rate of speed constant enough to record sound without wows and flutters. In one method developed, it is proposed that an added magnetic sound film be attached to the back of the picture, or that the added magnetic sound film be perforated as is the picture film but not necessarily attached to the film, in which case the magnetic sound film would bunch up between the supply spool and the drive sprocket, this bunching gradually increasing as the spool is unwound until it would eventually stop the camera.

The present invention provides a method of obviating these difficulties, making it possible to use magnetic recording means in professional sound recording studios resulting in much economy over the old method, and by small adaptations to 16 mm. cameras and projectors making

2 available efficient and synchronized sound recording and projection in this field.

An object of this invention is to make it possible to record sound magnetically with a motion picture camera by the addition of an adapter, a microphone and amplifier, and to have the sound so recorded re-recorded on the picture film either magnetically or in the usual photo-electric manner, either advanced a certain number of frames ahead of the picture as is the usual practice, or with the sound adjacent to the picture or advanced or retarded in relation to picture any number of frames desired.

Another object is to enable users of motion picture cameras and projectors to project the sound recorded with the camera either magnetically or photo-electrically, with a known magnetic sound adaptation to their projector in such a manner that they will not be prevented from using in the same projector available films which have been recorded by photo-electric means.

A further object is to accomplish magnetic sound recording in synchronization with motion picture on a separate sound record, in such a manner that said sound record can be retained, the sound recorded thereupon erased, and the sound record medium used over again.

In order to accomplish these objects this invention consists of avoiding the addition of a magnetic sound track to the picture film for use at the time it is run through the camera. Instead, the sound is recorded in a magazine adapter upon another base for the magnetizable material consisting of paper, cellulose acetate, cellulose nitrate or other thin flexible base upon which the material has been placed according to present day practice, and which base has perforations like the picture film for ease in editing and may be of the same width as the picture film or narrower, although it must be wide enough for a sufficiently wide magnetic layer thereupon. This magnetic sound film is not supplied on the same spool as the picture film but comes on a spool to be used in a specially made magazine which can be manufactured to fit on any camera on the market, except those known as magazine cameras in which a magazine containing the picture film is inserted bodily into the camera for exposure of the film. Power to run the magnetic sound film through the magazine is supplied by the camera motor, and constant speed of the magnetic sound film over the magnetic sound recording head is maintained by a roller mounted with a fly-wheel in the magazine. This magazine magnetic sound film can, of course, be used in a regular photo-electric sound recorder by changing the photo-electric recording means for magnetic means.

Another object of the present invention is to provide in combination with a motion picture camera, a magazine, means for securing said magazine to said camera and means within said magazine for moving sound film.

Another object is to provide an auxiliary magazine for a hand camera comprising, a housing, a supply spool rotatably mounted within said housing and adapted to carry a sound film, a takeup spool rotatably mounted within said housing and adapted to carry a sound film, a motor mounted within said housing, and means operatively connecting said motor with said take-up spool to rotate the same in the desired direction.

A further object is to provide in combination with a hand camera, a magazine, a supply spool rotatably mounted within said magazine and adapted to carry a sound film, a take-up spool rotatably mounted within said magazine and adapted to carry a sound film, a motor, means operatively connecting said motor with said take-up spool to rotate the same in the desired direction, and means for securing said magazine to said camera.

The above objects, further advantages thereof, and its operation will become more apparent from the following detailed description and reference to the accompanying drawings forming part of this application.

Figure 2:
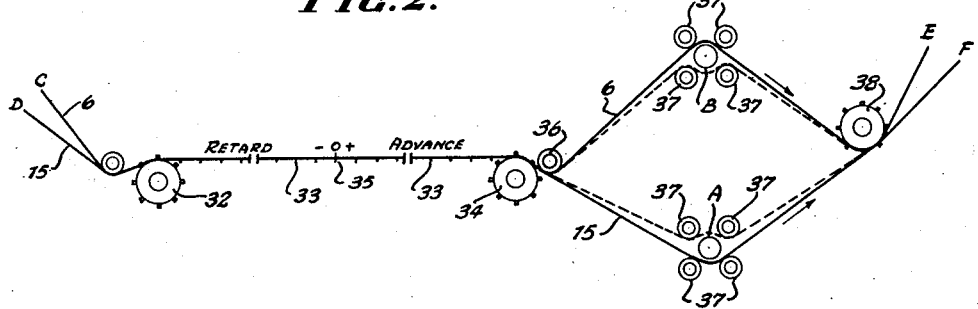

In the drawing in which the same parts are denoted by the same reference numerals throughout the several views;

Figure 1 is a sectional view showing the auxiliary sound magazine and embodying the features of the present invention; and Figure 2 is a schematic view showing a method advancing or retarding the sound film with reference to the picture film in re-recording.

Referring to Figure 1 there is shown on the left schematically a section of a camera of the portable type recognizable as the well known Keystone, consisting of a case 1 having therein mounts 2 and 3 for film supply and take-up spools 4 and 5 and means for moving the film 6 through the picture gate 7 of the camera, said means consisting of the sprocket 8 and a reciprocating claw mechanism (not shown) operating in the gate. The film 6 runs with a constant motion sufficient for the picture taking purposes of the camera, but not sufficient for efficient sound recording, over the sprocket 8 and under the rollers 9, the loops 6A providing means to allow operation of the reciprocating claw mechanism, through the gate 7, to return under the sprocket 8 and over the rollers 9A to the take-up spool 5. Other details like the viewfinder, the upper and lower parts of cases and spools, shutter, driving motor and mechanism, microphone, and amplifier, have been omitted because they are unnecessary for a full and complete understanding of the invention. The numeral 7a indicates the lens assembly of any conventional make.

On the right of Figure 1, at the back of the camera, is shown a cutaway section of the magazine which according to this invention is to be adapted to the camera. The case of the magazine 14 is held to the camera case 1 by the nuts and bolts 16. The magnetic sound film 15 is fed through the mechanism from the supply spool 17 and is taken up on the spool 18. From the supply spool 17 the magnetic sound film 15 passes under the roller 19 and around the constant speed roller 20, which is mounted with a fly wheel 21 as is the practice in film sound recording machines and projectors. As the film 15 passes around the roller 20, it is kept in contact therewith by a pressure roller 28, mounted on the movable arm 28A equipped with a spring 28B. The fly wheel 21 may be placed in the film supply section of the magazine to operate under the spools, or it may be placed on the other side of the casing in a housing formed by a plate added to the other side, in order that there would be better support for the fly wheel shaft. From the constant speed roller 20 the sound film 15 passes under the rollers 26 and 26A and around the magnetic sound recording head 25, under the tension roller 24 which is mounted on a movable arm 24A from roller 26A, the proper tension being exerted upon the loop 15A through the spring 24B. The sound film 15 then passes over the helper sprocket 30, to join the picture film at the sprocket 8 which it encircles to return under the sprocket 30 and over the rollers 29 to the take-up spool 18. As the sound film 15 passes over the magnetic recording head 25 it is kept in contact therewith by the felt pad 27 which is mounted on the movable arm 27A from the roller 19, the spring 27B exerting the required amount of pressure. The helper sprocket 30 is powered by the force of the sound film in its connection with the picture film drive sprocket 8 and by a small motor (not shown) which also drives the take-up spool 18. The magazine take-up spool 18 could be powered by a number of different methods, including a spring belt drive from the take-up spool shaft 3 of the camera, or by gears and a shaft from the camera mechanism. Since there will already be a certain additional drag upon the camera motor, to run the usual amount of both sound and picture film at one winding, it is desirable to power this spool and the helper sprocket 30 with a separate motor 18a which can fulfill both functions, namely to help the camera motor by lessening the drag on sprocket 8 and to drive the take-up spool 18. Motor 18a drives the take-up spool 18 by means of a belt 18b connected to and rotating the shaft 18c. This motor can be added to the magazine construction by a spring motor of relatively weak power and simple and cheap construction. Camera-mechanism control of the basic speed of the sound film as it runs through the magazine will be accomplished as indicated and by constructing the magazine take-up spool and helper sprocket motor and mechanism to exercise less power than the power sprocket 8 of the camera. At any point between the spools 4 or 5 and the sprocket 8 the two films should be punch marked together in order that the starting point of both films may be synchronized. With the adapting magazine as described and the new method as described, the magnetic sound recording head 25 is energized by an amplifier (not shown) amplifying the variations in electrical current brought to it by a microphone (not shown), and in turn magnetizes the magnetic sound film as it passes in contact with the magnetic recording head 25 according to the well known principle developed by Valdemar Poulsen and for so long called the Telegraphone. Because of the methods outlined, the synchronization of the two films together is automatic. After running the two films as described and recording sound as desired while exposing actions on the picture film, the user can send the two films to the laboratory with instructions regarding re-recording of the sound on the picture film.

In using this type of sound recording with a silent camera, sound film must be used if the magnetic sound recorded as outlined is to be re-recorded on the same film that was run through the camera. This sound film has perforations only on one side, whereas the camera power sprockets have teeth on both sides to engage these perforations and the reciprocating claw mechanisms often have a claw for each side of the film. Therefore, the silent camera will have to be changed to a claw or claws only on one side of the film and the sprockets will have to be similarly changed to the sound projector type of sprocket having teeth only on one side, changes that will be most inexpensive.

Various modified forms of the magazine adapter shown in Figure 1 will occur to those skilled in this art in order to adapt the present invention to the different operating mechanisms found in cameras on the market. The concept of the present invention is the provision of a separate magazine to house mechanism for moving, and for recording sound upon, a separate magnetic sound film in synchronization or synchronizable with the action exposed upon the picture film, the basic speed of the sound film to be controlled either by running the said sound film into the motion picture camera where it is synchronized with the picture film, or by other means to control the speed of the magazine sound film by the camera mechanism. For example the helper sprocket 30 of Figure 1 could be eliminated. Or in certain cameras not having a single central film drive sprocket the basic speed of the sound film could be controlled by passing it with the picture film through the cameras driving mechanism and film gate. Or the sound film could be made to run at the same speed as the picture film, but without leaving the magazine, by controlling the revolving speed of the helper sprocket 30 with a perforated belt encircling it and the sprocket 8, in which case the sound film would go directly around the sprocket 30 and thence to the take-up spool 18 and which would make it possible to cause the sound film to move faster or slower, if desired, by altering the diameter of the sprocket 30.

The magazine take-up spool for the sound film can be powered by a number of different methods, including a spring belt drive from the take-up spool shaft of the camera or gears and a shaft from the camera mechanism. Since there will already be a certain additional drag upon the camera motor, to run the usual amount of both sound and picture film at one winding, it is desirable to power this spool with a separate motor which can then fulfill both functions, and can be added to the magazine construction by a spring motor of relatively weak power and simple and cheap construction. Camera-mechanism control of the speed of the sound film as it runs through the magazine will be accomplished as indicated and by constricting the magazine take-up spool motor and mechanism to exercise less power than the power sprockets of the camera. Thus the slight pull of the magazine take-up spool will act only to take up the sound film and as a help to the camera motor.

In considering commercial application of this invention, where it is essential to keep manufacturing costs of the magazine at a minimum, a regular camera case of the more inexpensive type, for which machine tools and presses are already set up, can be used for the frame of the magazine, the film part of the camera case housing the supply and take-up spools, the magnetic recording equipment and channel, and the other or spring and mechanism side of the camera case housing the take-up spool and sprocket motor mechanism and the fly wheel.

It is possible to adapt either a silent or a sound projector both to record sound by magnetic means and to reproduce sound either by magnetic or photo-electric means, or by both. This will enable the projector owner to put sound on his silent films by adding to the projector a magnetic record and playback head, or both combined, and supplying the appropriate microphone, amplifier and speaker. This adaptation can be made to be interchangeable with the sound drum of certain projectors, in which case the magnetic reproducing head will touch the magnetic sound track a certain number of frames ahead of the picture as usual, or it may be necessary in some projectors to add the adaptation at a point which will place the magnetic sound in some other relationship to the position of the relative picture, perhaps even after the picture. Because of these different possibilities, the user of double film magnetic recording may decide to have the films returned with the sound which he has recorded in accordance with this invention re-recorded either magnetically or photo-electrically, because this re-recorded sound track may be any number of frames advanced or retarded in relation to the picture, and because the magnetic sound track on the processed film picture film may be placed either on the emulsion or base side of the film, it is necessary for a laboratory to be able to re-record the sound recorded on the magnetic sound film in a manner to meet any requirement. Referring to Figure 2, a machine designed to take care of these eventualities is diagrammatically outlined.

In Figure 2 the two films 6 and 15 as shown in Figure 1 pass from supply spools (not shown) as indicated at positions C and D over the sprocket 32 and along the scale 33 to the sprocket 34. The scale 33 is marked in units of film frames progressing from one upwards in either direction from the zero point 35. By placing the punched start mark on the picture film at zero 35 and the punch mark on the magnetic sound film in the proper position, the number of frames which the magnetic sound recording is advanced or retarded in relation to the relative picture can be controlled as desired. The two films separate at roller 36 to pass through the idler rollers 37 as indicated. Magnetic recording heads or photo-electric recording mechanisms of known type can be locked into position as desired in the center of the square of rollers 37 on either point A or B, to face either side of either film according to which side the magnetic material has been placed on the magnetic sound film and according to whether the magnetically recorded sound is to be re-recorded by photo-electric means upon the emulsion side of the picture film or magnetically on either side. The magnetic or photo-electric recording head placed in position at point B is connected through a suitable amplifier to the magnetic pickup head to be placed in position A. Thus the magnetic record of frequency variations recorded upon the magnetic sound film 15 is re-recorded as desired on the picture film. After passing through the re-recording machine the two films join at sprocket 38 and pass to take-up spools (not shown) from points E and F.

The present invention embraces a method and apparatus for recording sound from a perforated magnetic recording tape upon a motion picture film either magnetically or photo-electrically on either side of the film in whatever relationship to the position of the relative picture on said film as may be desired, consisting of a scale marked in progressions of the size of one picture frame in either direction from a zero point upon which the number of frames sound from the magnetic recording tape is to be advanced or retarded in its relationship to picture may be measured and locked into position to pass through a re-recording mechanism consisting of two channels one for the magnetic recording medium and one for the picture film, the play-back channel for the magnetic recording tape consisting of a magnetic play-back head, means to keep said magnetic recording tape in contact with said play-back head, means to place said play-back head to re-record from either side of said magnetic recording tape, and means to amplify frequency variations recorded magnetically upon said magnetic recording tape for re-recording upon the picture film, the channel for picture film consisting of removable and replaceable photo-electric and magnetic recording means, means to assure proper contact of a magnetized film with said magnetic recording means and to assure proper positioning of the picture film emulsion in use with said photo-electric recording means, means to draw said picture and sound film through said recording channel at a constant rate of speed from supply spools to take-up spools.

Should the user of a magnetic sound film magazine as described desire that the sound recorded on the magnetic sound film be re-recorded on his picture film by magnetic means, the film should be developed first, after which the magnetizable material is placed upon it by known means. Should the user desire the sound to be re-recorded photo-electrically, this re-recording must be done before the film is processed.

The concept of the present invention embraces a device for use in combination with a motion picture camera comprising, a magazine, means for securing said magazine to said camera, and means for moving sound film in operative position within said magazine in synchronization with relation to the picture film of the camera.

More particularly, the present invention relates to an apparatus for recording sound magnetically in synchronization with the picture taken in a motion picture camera which comprises, an auxiliary magazine to house mechanism for carrying and recording sound upon a perforated magnetizable sound tape; said magazine comprising a housing, means to attach said housing to the said camera, a supply spool rotatably mounted within said housing and adapted to carry the magnetic sound film, a take-up spool rotatably mounted within said housing and adapted to take up said sound film, a magnetic recording head mounted in said housing and connected through an amplifier into a microphone, means to keep the magnetic sound film in contact with said magnetic recording head, means to move the magnetic sound film over the magnetic recording head at the same speed as the picture film moves through the camera, means to assure constant speed of the magnetic sound film in its movement over said magnetic recording head, means to keep the magnetic sound film in contact with said constant speed mechanism, means to employ the camera mechanism for drawing said magnetic sound film from said supply spool over the constant speed mechanism and magnetic recording head to the take-up spool, a motor within said housing, means operatively connecting said motor to said take-up spool, a helper sprocket mounted within said housing, and means operatively connecting said motor to said sprocket in such a manner as to exercise little power thereupon.

Various modifications of the present invention will be apparent to those skilled in the art, and it is therefore desired to be limited only by the scope of the appended claims.

What I claim is:

1. In combination with a motion picture camera, a magazine, a supply spool rotatably mounted within said magazine and adapted to carry a perforated magnetic sound recording tape, a take-up spool rotatably mounted within said magazine and adapted to carry said perforated magnetic sound recording tape, a motor, means operatively connecting said motor with said take-up spool to rotate the same in the desired direction, means for securing said magazine to said camera, means within said magazine for recording sound magnetically upon said perforated magnetic sound recording tape, and means for drawing said magnetic sound recording tape into operative position within said magazine and controlled by the camera mechanism with relation to the speed of the picture film as said picture film runs through the camera.

2. An apparatus for recording sound magnetically in synchronization with the picture taken in a motion picture camera which comprises, an auxiliary magazine to house mechanism for carrying and recording sound upon a perforated magnetizable sound tape; said magazine comprising a housing, means to attach said housing to the said camera, a supply spool rotatably mounted within said housing and adapted to carry the magnetic sound film, a take-up spool rotatably mounted within said housing and adapted to take up said sound film, a magnetic recording head mounted in said housing and connected through an amplifier into a microphone, means to keep the magnetic sound film in contact with said magnetic recording head, means to move the magnetic sound film over the magnetic recording head at the same speed as the picture film moves through the camera, means to assure constant speed of the magnetic sound film in its movement over said magnetic recording head, means to keep the magnetic sound film in contact with said constant speed mechanism, means to employ the camera mechanism for drawing said magnetic sound film from said supply spool over the constant speed mechanism and magnetic recording head to the take-up spool, a motor within said housing, and means operatively connecting said motor to said take-up spool.

3. In combination, a motion picture camera having a casing provided with an opening, an auxiliary magazine detachably secured to said camera casing, said auxiliary magazine including a casing provided with an opening in registry with said opening in the camera casing, means within said auxiliary magazine for recording sound magnetically upon a perforated magnetizable film, said last mentioned means including a sound recording head and mechanism for moving said film over said recording head at a constant speed, and said magnetizable film being adapted to move from said auxiliary magazine through said openings into said camera casing and to be returned through said openings into said auxiliary magazine.

4. An apparatus for re-recording sound from a perforated magnetic recording tape upon a motion picture film either magnetically or photo-electrically on either side of the film in whatever relationship to the position of the relative picture on said film as may be desired, consisting of a scale marked in progressions of the size of one picture frame in either direction from a zero point upon which the number of frames sound from the magnetic recording tape is to be advanced or retarded in its relationship to picture may be measured and locked into position to pass through a re-recording mechanism consisting of two channels one for the magnetic recording medium and one for the picture film, the play-back channel for the magnetic recording tape consisting of a magnetic play-back head, means to keep said magnetic recording tape in contact with said play-back head, means to place said play-back head to re-record from either side of said magnetic recording tape, and means to amplify frequency variations recorded magnetically upon said magnetic recording tape for re-recording upon the picture film, the channel for picture film consisting of removable and replaceable photo-electric and magnetic recording means, means to assure proper contact of a magnetized film with said magnetic recording means and to assure proper positioning of the picture film emulsion in use with said photo-electric recording means, means to draw said picture and sound film through said recording channel at a constant rate of speed from supply spools to take-up spools.

5. In combination, a motion picture camera comprising a casing, picture film supply and take-up spools and a sprocket within said casing, said sprocket being positioned between said spools to have trained over it the perforated picture film passing between said spools, a second casing, means for attaching said casings together, sound film supply and take-up spools within said second casing, and a passage between said casings aligned with said sprocket through which sound film between said sound film spools is adapted to be passed to be trained over said sprocket to thereby synchronize the movements of the picture and sound films.

References Cited in the file of this patent

UNITED STATES PATENTS

| Number | Name | Date |
| --- | --- | --- |
| 1,843,972 | De Forest | Feb. 9, 1932 |
| 1,845,236 | Chipman | Feb. 16, 1932 |
| 1,866,712 | Jones | July 12, 1932 |
| 1,891,277 | Fear | Dec. 20, 1932 |
| 1,930,913 | Terry | Oct. 17, 1933 |
| 1,957,525 | Brown et al. | May 8, 1934 |
| 1,985,552 | Ross | Dec. 25, 1934 |
| 1,991,472 | Stern | Feb. 19, 1935 |
| 2,008,881 | Thomas | July 23, 1935 |
| 2,119,136 | McClay | May 31, 1938 |
| 2,322,144 | Kirschbaum | June 15, 1943 |
| 2,347,325 | Kirschbaum | Apr. 25, 1944 |
| 2,485,839 | O'Dea | Oct. 25, 1949 |